United States Patent

Nair et al.

[11] Patent Number: 5,688,975
[45] Date of Patent: Nov. 18, 1997

[54] RARE EARTH STABILIZED CR/TI SUBSTITUTED MOLECULAR SIEVES

[75] Inventors: Vinayan Nair, Oak Park; Deng-Yang Jan, Elk Grove Village; Robert Lyle Patton, Rolling Meadows; Ben A. Wilson, Algonquin, all of Ill.; Donald F. Best, Mahopac, N.Y.

[73] Assignee: UOP, Des Plaines, Ill.

[21] Appl. No.: 630,317

[22] Filed: Apr. 10, 1996

[51] Int. Cl.$^6$ ............... B01J 29/04; B01J 29/87
[52] U.S. Cl. ............... 549/531; 208/113; 208/134; 423/21.5; 502/65; 568/629; 568/700; 568/860; 585/275; 585/648; 585/666; 585/708
[58] Field of Search ............... 423/21.5; 502/65; 208/113, 134; 549/524, 531; 568/629, 860, 700; 585/275, 648, 666, 708

[56] References Cited

U.S. PATENT DOCUMENTS

| | | | |
|---|---|---|---|
| 3,130,007 | 4/1964 | Breck et al. | 423/711 |
| 4,125,591 | 11/1978 | Lindsley | 502/79 |
| 4,141,860 | 2/1979 | O'Hara et al. | 502/65 |
| 4,410,501 | 10/1983 | Taramasso et al. | 423/705 |
| 4,480,047 | 10/1984 | Beck et al. | 502/65 |
| 4,664,780 | 5/1987 | Lochow et al. | 208/120 |
| 4,701,431 | 10/1987 | Pine | 502/73 |
| 4,711,770 | 12/1987 | Skeels et al. | 423/713 |
| 4,855,036 | 8/1989 | Chiang et al. | 208/120 |
| 4,929,583 | 5/1990 | Pasek et al. | 502/64 |
| 5,098,687 | 3/1992 | Skeels et al. | 423/328 |
| 5,186,918 | 2/1993 | Skeels et al. | 423/718 |
| 5,202,295 | 4/1993 | McCauley | 502/65 |
| 5,233,097 | 8/1993 | Nemeth et al. | 568/803 |
| 5,354,875 | 10/1994 | Nemeth et al. | 549/531 |
| 5,447,694 | 9/1995 | Swaroop et al. | 422/171 |

FOREIGN PATENT DOCUMENTS

WO9324592  9/1993  WIPO  ............... C10G 47/16

OTHER PUBLICATIONS

*Applied Catalysis*, 57, (1990) L1–L3, Thangaras, A., et al.

*Primary Examiner*—C. Warren Ivy
*Assistant Examiner*—Garth M. Dahlen
*Attorney, Agent, or Firm*—Thomas K. McBride; Eugene I. Snyder; Frank S. Molinaro

[57] ABSTRACT

Molecular sieve compositions have been synthesized which are resistant to the loss of framework atoms. Specifically, the molecular sieves of the invention have the empirical formula

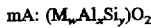

$$mA: (M_wAl_xSi_y)O_2$$

where A is at least one rare earth metal, M is chromium or titanium and "m", "w", "x" and "y" are the mole fractions of A, M, Al and Si respectively. Applicants have discovered that the rare earth metals prevent loss of chromium and titanium from the framework and degradation of the molecular sieve. Along with the composition, a process for preparing the composition and processes using the composition are disclosed and claimed.

17 Claims, No Drawings

RARE EARTH STABILIZED CR/TI SUBSTITUTED MOLECULAR SIEVES

FIELD OF THE INVENTION

This invention relates to novel molecular sieves, a process for preparing them and processes using them. The molecular sieve contains aluminum, silicon and chromium or titanium as framework tetrahedral oxide units and has been exchanged with at least one rare earth metal.

BACKGROUND OF THE INVENTION

Molecular sieves of the crystalline aluminosilicate zeolite type are well known in the art and now comprise over 150 species of both naturally occurring and synthetic compositions. In general, the crystalline zeolites are formed from corner-sharing $AlO_2$ and $SiO_2$ tetrahedra and are characterized by having pore openings of uniform dimensions, having a significant ion-exchange capacity and being capable of reversibly desorbing an adsorbed phase which is dispersed throughout the internal voids of the crystal without significantly displacing any atoms which make up the permanent crystal structure.

These zeolitic materials can be modified by removing aluminum from the framework and replacing it with elements such as silicon, chromium, tin and titanium. See, U.S. Pat. No. 4,711,770 (silicon substitution), U.S. Pat. No. 5,186,918 (substitution of chromium) and U.S. Pat. No. 5,098,687 (substitution of titanium). These substituted molecular sieves can be used as catalysts in various hydrocarbon processes such as cracking and hydrocracking. However, it has been found that these materials suffer considerable damage as they are processed into a form which can be used in these processes. One thing which appears to be happening is that chromium or titanium is removed from the framework leading to a loss of surface area and crystallinity. Accordingly, there is a need for stabilizing titanium or chromium substituted zeolites.

Applicants have discovered that ion exchanging a rare earth onto the molecular sieve stabilizes the molecular sieve against loss of chromium or titanium from the framework. The art discloses the use of rare earth cations to stabilize zeolites. For example, U.S. Pat. No. 4,701,431 discloses a rare earth metal stabilized faujasite. U.S. Pat. No. 4,125,591 discloses a rare-earth exchanged zeolite Y prepared by treating a zeolite Y with a rare earth metal salt solution, calcining and then treating with a second solution of a rare earth metal salt U.S. Pat. No. 4,664,780 discloses a hydrocarbon cracking process with a rare earth exchanged zeolite Y that further contains yttrium. Finally, WO-93/24592-A1 discloses a hydrocracking process using a catalyst containing a zeolite Y exchanged with rare earth cations.

None of the cited references hint or suggest that a rare earth cation can be used to stabilize a chromium or titanium substituted zeolite against loss of chromium or titanium from the framework.

SUMMARY OF THE INVENTION

As stated, the present invention relates to a novel molecular sieve, a process for preparing the molecular sieve and processes using the molecular sieve. Accordingly, one embodiment of the invention is a molecular sieve having a three-dimensional microporous framework structure which has an empirical formula on an anhydrous basis of:

$$mA: (M_wAl_xSi_y)O_2$$

where A is at least one rare earth metal, "m" is the mole fraction of A and varies from about 0.01 to about (w+x), M is chromium or titanium, "w", "x", and "y" are the mole fractions of M, aluminum and silicon, respectively, present as framework tetrahedral oxide units and "w" has a value of about 0.01 to about 0.49, "x" has a value of about 0.01 to about 0.49 and "y" has a value of about 0.50 to about 0.98, said molecular sieve characterized in that it has the x-ray diffraction pattern characteristic of zeolite Y, erionite, mordenite, zeolite L, offertite, chabazite, ZSM-5, LZ-105, zeolite omega or zeolite beta.

Another embodiment of the invention is a process for preparing a molecular sieve having a three-dimensional microporous framework structure which has an empirical formula on an anhydrous basis of:

$$mA: (M_wAl_xSi_y)O_2$$

where A is at least one rare earth metal, "m" is the mole fraction of A and varies from about 0.01 to about (w+x), M is chromium or titanium, "w", "x", and "y" are the mole fractions of M, aluminum and silicon, respectively, present as framework tetrahedral oxide units and "w" has a value of about 0.01 to about 0.49, "x" has a value of about 0.01 to about 0.49 and "y" has a value of about 0.50 to about 0.98, said molecular sieve characterized in that it has the x-ray diffraction pattern characteristic of zeolite Y, erionite, mordenite, zeolite L, offertite, chabazite, ZSM-5, LZ-105, zeolite omega or zeolite beta, the process comprising contacting a crystalline zeolite having a $SiO_2/Al_2O_3$ ratio of at least 3 with a fluoro salt of M at a pH of about 3 to about 7, whereby framework aluminum atoms of the zeolite are removed and replaced by extraneous M atoms, contacting the M substituted zeolite with an aqueous solution containing at least one rare earth salt at ion exchange conditions to provide said molecular sieve.

Yet another embodiment of the invention is a hydrocarbon conversion process comprising contacting a hydrocarbon with a catalyst at hydrocarbon conversion conditions to give a converted product, the catalyst comprising a molecular sieve having a three-dimensional microporous framework structure which has an empirical formula on an anhydrous basis of:

$$mA: (M_wAl_xSi_y)O_2$$

where A is at least one rare earth metal, "m" is the mole fraction of A and varies from about 0.01 to about (w+x), M is chromium or titanium, "w", "x", and "y" are the mole fractions of M, aluminum and silicon, respectively, present as framework tetrahedral oxide units and "w" has a value of about 0.01 to about 0.49, "x" has a value of about 0.01 to about 0.49 and "y" has a value of about 0.50 to about 0.98, said molecular sieve characterized in that it has the x-ray diffraction pattern characteristic of zeolite Y, erionite, mordenite, zeolite L, offertite, chabazite, ZSM-5, LZ-105, zeolite omega or zeolite beta.

These and other embodiments will become more apparent after a detailed description of the invention.

DETAILED DESCRIPTION OF THE INVENTION

The molecular sieves of the present invention are described by the empirical formula, on an anhydrous basis of:

$$mA:(M_wAl_xSi_y)O_2$$

where A is at least one rare earth metal, "m" is the mole fraction of A and varies from about 0.01 to about (w+x), M is chromium or titanium, "w" is the mole fraction of M and has a value of about 0.01 to about 0.49, "x" is the mole fraction of aluminum and has a value of about 0.01 to about 0.49 and "y" is the mole fraction of silicon and has a value of about 0.50 to about 0.98. The aluminum, silicon and M metals are present as tetrahedral oxide units which make up the molecular sieve framework and the molecular sieve has the x-ray diffraction pattern characteristic of zeolite Y, erionite, mordenite, zeolite L, offertite, chabazite, ZSM-5, LZ-105, zeolite omega or zeolite beta. The rare earth metals include lanthanum, cerium, neodymium, praseodymium, europium, samarium, gadolinium, dysprosium, holmium and mixtures thereof.

The chromium or titanium molecular sieves of this invention can be prepared by means well known in the art. For example, the synthesis of titanium aluminosilicates is described in U.S. Pat. No. 4,410,501 and *Applied Catalysis*, 57, (1990) L1–L3, both of which are incorporated by reference. One preferred method involves taking a starting zeolite and replacing some of the aluminum with chromium or titanium. This method is disclosed in U.S. Pat. No. 5,186,918 (substitution of chromium) and U.S. Pat. No. 5,098,687 (substitution of titanium), both of which are incorporated by reference.

The starting zeolite is represented by the empirical formula:

$$(Al_aSi_b[]_z)O_2$$

where "a" is the mole fraction of aluminum, "b" is the mole fraction of silicon, "[]" denotes defect sites in the framework and "z" is the mole fraction of defect sites in the framework. In many cases, the "z" value for the starting zeolite is zero and the defect sites are simply eliminated from the expression. Numerically, the sum of the values a+b+z=1.

If defect sites are present, then the molecular sieves of this invention have an empirical formula of:

$$nA:(Al_uSi_vM_w[]_{z1})O_2$$

where A is as defined above, "n" is the mole fraction of A and varies from about 0.01 to about (w+u), "u" is the mole fraction of aluminum and ranges from about 0.01 to about 0.49, "v" is the mole fraction of silicon and ranges from about 0.50 to about 0.98, M is chromium or titanium, "w" is the mole fraction of M and ranges from about 0.01 to about 0.49, "[]" is framework defect sites and "z1" is the mole fraction of defect sites in the framework and ranges from greater than zero to about 0.2. Further, u=a−N where "a" is the mole fraction of aluminum in the starting zeolite and "N" is the mole fraction of aluminum atoms removed from the framework. Numerically, the sum of the values u+v+w+z1=1.

The preparation of the various zeolites enumerated above is also well known in the art. For example, the preparation of zeolite Y is disclosed in U.S. Pat. No. 3,130,007 which is incorporated by reference. Further references disclosing the preparation of the other zeolites can be found in "ZEOLITE MOLECULAR SIEVES, Structure, Chemistry and Use," Donald W. Breck, John Wiley & Sons, 1974.

The first step in preparing the molecular sieve of this invention involves contacting and reacting at a temperature of about 20° C. to about 95° C. the starting zeolite with a fluoro salt of chromium or titanium. Use of a metal fluoro salt serves the dual purpose of extracting aluminum atoms from the framework and inserting chromium or titanium into the framework (replacing the aluminum).

The metal fluoro salts which can be used are those described by the formula $$A_{2/b}TiF_6 \text{ or } A_{2/b}CrF_5$$

where "A" is a cation having valence "b". Illustrative of the A cations are alkyl ammonium$^+$ $NH_4^+$, $H^+$, $Mg^{+2}$, $Li^+$, $Na^+$, $K^+$, $Ba^{+2}$, $Cd^{+2}$, $Cu^{30}$, $Cu^{+2}$, $Ca^{+2}$, $Cs^+$, $Fe^{+2}$, $Ca^{+2}$, $Pb^{+2}$, $Mn^{+2}$, $Rb^+$, $Ag^+$, $Sr^{+2}$, $Tl^+$ and $Zn^{+2}$. The ammonium and hydronium cation forms of the fluoro salts are generally preferred because of their solubility in water and also because these cations form water soluble by-product salts upon reaction with the zeolite, namely $(NH_4)_3AlF_6$ and/or $(NH_4)_2AlF_5$.

The metal fluoro salt is contacted with the zeolite Y in the form of an aqueous solution or slurry at a pH in the range of about 3 to about 7. This solution is contacted with the zeolite either incrementally or continuously at a slow rate such that a sufficient proportion of the framework aluminum atoms removed are replaced by chromium or titanium atoms to retain at least 50%, preferably at least 90% of the framework structure of the starting zeolite. The amount of metal fluoro salt necessary to carry out the process of this invention can vary considerably, but should be at least in an amount of 0.0075 moles of metal fluoro salt per 100 grams of starting zeolite. Once the reaction is complete, the product molecular sieve containing chromium or titanium is isolated by conventional techniques such as filtration.

The next step in preparing the molecular sieves of this invention is to ion exchange the molecular sieve with at least one rare earth. The rare earths which can be used include lanthanum, cerium, neodymium, praseodymium, europium, samarium, gadolinium, dysprosium, holmium and mixtures thereof. Ion exchange can be carried out in a batch or continuous process with a continuous process preferred. In a batch process, the zeolite is mixed with an aqueous solution containing a metal salt (about 1 molar) and the resulting mixture is refluxed for about 2 hours. The mixture is next filtered to isolate the exchanged zeolite. Additionally, the pH of the solution is adjusted to be between about 4 to about 6. If a continuous process is used, the zeolite is placed in a column and the metal salt solution is flowed through the column. Regardless of what type of process is used, the metal salts which can be used to carry out the exchange include lanthanum chloride, lanthanum nitrate, cerium chloride, cerium nitrate, neodymium chloride, neodymium nitrate, praseodymium chloride, praseodymium nitrate, europium chloride, europium nitrate, samarium chloride, samarium nitrate, gadolinium chloride, gadolinium nitrate, dysprosium chloride, dysprosium nitrate, holmium chloride and holmium nitrate. It is most convenient to use a mixture of rare earth chlorides which is commercially available and which contains praseodymium chloride, neodymium chloride, lanthanum chloride and cerium chloride.

The molecular sieves of this invention are useful as catalysts or catalyst supports in any of several hydrocarbon conversion processes. If it is desired to deposit catalytic metals onto the instant compositions, the composition can be impregnated or otherwise loaded with catalytically active metals by methods well known in the art (e.g., ion exchange or impregnation) and used, for example, in fabricating catalyst compositions having silica or alumina bases. Illustrative of the hydrocarbon conversion process which the instant compositions (with or without additional catalytic metals) catalyze are: cracking, hydrocracking, alkylation of aromatics or isoparaffin, and isomerization including xylene isomerization. The product derived from any of these processes is generally referred to as a hydrocarbon converted product.

Specific conditions for the above-named reactions are well known in the art and generally depend on the type of hydrocarbon to be converted. Thus, the instant compositions which may contain a hydrogenation promoter such as platinum or palladium can be used to hydrocrack heavy petroleum residual stocks, cyclic stocks and other hydrocrackable charge stocks at temperatures in the range of 400° F. to 825° F. (204° C. to 441° C.) using molar ratios of hydrogen to hydrocarbon in the range of between 2 and 80, pressures between 10 and 3500 psig (0.171 to 24.23 MPa), and a liquid hourly space velocity (LHSV) of from 0.1 to 20, preferably 1.0 to 10.

Catalytic cracking processes are preferably carried out with the instant composition using feedstocks such as gas oils, heavy naphthas, deasphalted crude oil residua, etc., with gasoline being the principal desired product. Temperature conditions of 850° to 1100° F. (454° to 593° C.), LHSV values of 0.5 to 10 and pressure conditions of from about 0 to 50 psig (101 to 446 kPa) are suitable.

Isomerization reactions are carried out under conditions similar to those described above for reforming using somewhat more acidic catalysts. Olefins are preferably isomerized at temperatures of 500°–900° F. (260°–482° C.), while paraffins, naphthenes and alkyl aromatics are isomerized at temperatures of 700°–1000° F. (371°–538° C.). Particularly desirable isomerization reactions contemplated herein include the conversion of n-heptene and/or n-octane to isoheptanes, iso-octanes, butane to iso-butane, methylcyclopentane to cyclodexane, meta-xylene and/or ortho-xylene to paraxylene, 1-butene to 2-butene and/or isobutene, n-hexane to isohexane, cyclohexene to methylcyclopentene, etc. The preferred form of the catalyst is a combination of the instant composition with polyvalent metal compounds (such as sulfides) of metals of Group II-A, Group II-B and rare earth metals. For alkylation and dealkylation processes the instant compositions having pores of at least 5 Å, are preferred. When employed for dealkylation of alkyl aromatics, the temperature is usually at least 350° F. (177° C.) and ranges up to a temperature at which substantial cracking of the feedstock or conversion products occurs, generally up to about 700° F. (371° C.). The temperature is preferably at least 450° F. (232° C.) and not greater than the critical temperature of the compound undergoing dealkylation. Pressure conditions are applied to retain at least the aromatic feed in the liquid state. For alkylation the temperature can be as low as 250° F. (121° C.) but is preferably at least 350° F. (177° C.). In the alkylation of benzene, toluene and xylene, the preferred alkylating agents are olefins such as ethylene and propylene.

The compositions of this invention are also useful in hydrocarbon conversion processes involving oxygen or peroxides. Two such processes are the oxidation of aromatics using hydrogen peroxide (hydroxylation) and the epoxidation of olefins also using hydrogen peroxide. Both processes are well known in the art and are described for example in U.S. Pat. Nos. 5,233,097 and 5,354,875 respectively, both of which are incorporated by reference. Briefly the oxidation of aromatics involves reacting the hydrocarbon with the hydrogen peroxide over the molecular sieves of this invention at a temperature of about 10° C. to about 60° C. for a time of about 24 hours. The molar ratio of hydrogen peroxide to aromatic compound varies from about 0.2 to about 5. Solvents and surfactants may also be used to facilitate the reaction.

Epoxidation of olefins is carried out at temperatures of about 0° C. to about 100° C. at either atmospheric or elevated pressures by reacting the olefins with hydrogen peroxide in the presence of the instant molecular sieves, especially the titanium containing molecular sieves. The epoxidation can be performed either in a batch or a continuous mode. The ratio of olefinic compound to hydrogen peroxide may range from 1:10 to 10:1.

The following examples are presented in illustration of this invention and are not intended as undue limitations on the generally broad scope of the invention as set out in the appended claims.

EXAMPLE 1

Into a beaker there were combined 2,250 g of $NH_4$ Y zeolite (anhydrous basis) and 9 liters of deionized water. The resultant slurry was heated to 75° C. In another container, 527 g of $CrF_3$ and 537 g of $NH_4F$ were added with stirring to 4,504 ml deionized water, stirred for 15 minutes and then added to the hot zeolite slurry at a rate of 55 ml per minute. The resultant slurry was then heated to 95° C. over a 3 hour period which included a 1 hour digestion time. Next, the hot slurry was filtered and washed with warm deionized water and dried at room temperature for 4 days. Three series of lixiviation treatments were carried out on the resultant ammonium Cr—Y zeolite in order to remove residual fluoride ions. The first lixiviation treatment was carried out by adding the above dried zeolite powder to a 0.1 molar solution of $Al_2(SO_4)_3$ and heated to 60° C. for 2 hours. After this lixiviation treatment, the chromium containing molecular sieve was ammonium exchanged in 3 stages. Ammonium chloride in a 1:1 ratio of grams of ammonium salt to grams of zeolite was added to 12 liters of deionized water and stirred until dissolved. The chromium containing molecular sieve was added to the solution and heated to 85° C. for 4 hours. The slurry was filtered hot and washed warm with deionized water. After drying overnight, a second lixiviation treatment was conducted as described above. This was followed by another one stage ammonium exchange using the same experimental conditions as set out above. Finally, a third lixiviation treatment was conducted using the same experimental conditions as set out above except that a 0.2 molar $Al_2(SO_4)_3$ was used. This sample was identified as sample A.

EXAMPLE 2

Into a kettle there were combined 36 lbs. of $NH_4$ Y zeolite and 16 gallons distilled water. The slurry was stirred and heated to 75° C. A total of 7.17 kg of $(NH_4)_2 TiF_6$ salt was added to the $NH_4Y$ slurry at a rate of 717 g per 10 minutes. The kettle temperature was raised to 95° C. and held there for 3 hours. The ammonium Ti—Y molecular sieve was washed on a filter press with 65° C. distilled water until tests of the filtrate were negative for aluminum and fluoride. The filter cake was air dried for 1 hour in the filter press and left in the press overnight to dry. A lixiviation treatment was conducted on the ammonium Ti—Y molecular sieve by combining 10 gallons of distilled water into a kettle with 1730 grams of $Al_2(SO_4)_3$. All the ammonium Ti—Y was added to the kettle and heated to 55° C. with stirring. The slurry was held for 2 hours at about 50° C., while stirring. The ammonium Ti—Y molecular sieve was washed on a filter press with distilled water and the filter cake was air dried in the filter press overnight. This sample was identified as sample B.

EXAMPLE 3

In a container, 100 g (69.8 volatile free) of the Cr—Y molecular sieve of Example 1 (sample A) were mixed with 488.6 g of deionized water and 116.3 g of a rare earth chloride powder containing 3.06 wt. % Pr, 8.09 wt. % Nd, 22.8 wt. % La and 5.71 wt. % Ce. The resultant mixture was heated to 80° C. and held there for one hour. Next the slurry was filtered and rinsed with 3466 g of deionized water. Finally, the powder was heated to 110° C. and held there for 2 hours, after which it was heated to 550° C. in 2 hours, held there for 6 hours and then cooled. This sample was identified as sample C.

EXAMPLE 4

In a container there were placed 100 g (74.3 g volatile free) of the Ti—Y molecular sieve from Example 2 (sample B) mixed with 520.1 g of deionized water and 123.8 g of a rare earth chloride powder as described in Example 3. The resultant slurry was heated to 80° C., held there for 1 hour, filtered and rinsed with 6850 g of deionized water. The rare earth containing molecular sieve was heated to 110° C. and held there for 2 hours, after which it was heated to 550° C. in 2 hours, held there for 6 hours and then cooled. This sample was identified as sample D.

EXAMPLE 5

Samples A, B, C and D were subjected to a stability test as follows. A sample of each molecular sieve was placed in an oven, ramped to 220° C. (in 2 hours) and held there for 1 hour. Next the oven was ramped to 600° C. in 4 hours and held there for 1½ hours and then cooled. The calcined sample was hydrated overnight in a desiccator containing a saturated solution of $Mg(NO_3)_2$.

The rehydrated sample was now recalcined as described above. The samples were analyzed for physical properties both before and after the stability test. These results are presented in Table 1.

where A is at least one rare earth metal, "m" is the mole fraction of A and varies from about 0.01 to about (w+x), M is chromium or titanium, "w", "x", and "y" are the mole fractions of M, aluminum and silicon, respectively, present as framework tetrahedral oxide units and "w" has a value of about 0.01 to about 0.49, "x" has a value of about 0.01 to about 0.49 and "y" has a value of about 0.50 to about 0.98, said molecular sieve characterized in that it has the x-ray diffraction pattern characteristic of zeolite Y, erionite, mordenite, zeolite L, offertite, chabazite, ZSM-5, LZ-105, zeolite omega or zeolite beta.

2. The molecular sieve of claim 1 where the rare earth metal is selected from the group consisting of lanthanum, cerium, neodymium, praseodymium, europium, samarium, gadolinium, dysprosium, holmium and mixtures thereof.

3. The molecular sieve of claim 2 where the rare earth metal is a mixture of praseodymium, neodymium, lanthanum and cerium.

4. A molecular sieve having a three-dimensional microporous framework structure which has a unit empirical formula on an anhydrous basis of:

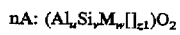

where A is at least one rare earth metal, "n" is the mole fraction of A and varies from about 0.01 to about (w+u), M is chromium or titanium, "u" is the mole fraction of aluminum and ranges from about 0.01 to about 0.49, "v" is the mole fraction of silicon and varies from about 0.50 to about 0.98, "w" is the mole fraction of M and varies from about 0.01 to about 0.49, [] is framework defect sites and "z1" is the mole fraction of defect sites in the framework and ranges from greater than zero to about 0.2 characterized in that the aluminum, silicon and M are present as tetrahedral oxide

TABLE 1

Effect of Rare Earth on The Physical Stability of Molecular Sieves

| Physical Property | Sample A | | Sample B | | Sample C | | Sample D | |
|---|---|---|---|---|---|---|---|---|
| | Before Test | After Test | Before Test | After Test | Before Test | After Test | Before Test | After Test |
| Langmuir S.A.* ($m^2/g$) | 764 | 406 | 715 | 582 | 725 | 719 | 616 | 595 |
| Total Pore Vol. (cc/g) | 0.34 | 0.21 | 0.35 | 0.30 | 0.33 | 0.33 | 0.33 | 0.30 |
| Avg. Pore Radius, Å | 13.8 | 16.0 | 15.3 | 16.1 | 14.1 | 14.3 | 15.6 | 15.8 |
| XRD UCS* (Å) | 24.63 | 24.38 | 24.63 | 24.57 | 24.58 | 24.60 | 24.62 | 24.63 |
| $SF_6$ Capacity, wt. % | 21.48 | 10.36 | 18.15 | 17.21 | 18.62 | 18.15 | 15.83 | 15.86 |
| $O_2$ Capacity, wt. % | 29.32 | 13.91 | 24.42 | 20.63 | 24.62 | 23.67 | 21.23 | 20.22 |

*S.A. = Surface Area; XRD UCS = X-ray Diffraction Unit Cell Size

The results presented in Table 1 clearly show the effect of rare earth cations on the stability of chromium and titanium molecular sieves. It is observed that both the chromium and titanium containing molecular sieves are severely degraded after the calcination/hydration/calcination treatment. This is indicated by the reduction in surface area, pore volume and adsorption capacity. Degradation of the framework structure is shown by the decrease in the unit cell size. However, when the rare earth cations are exchanged into the molecular sieves, the surface area, pore volume adsorption capacity and unit cell size are virtually unchanged between the fresh sample and the stability tested sample.

We claim as our invention:

1. A molecular sieve having a three-dimensional microporous framework structure which has an empirical formula on an anhydrous basis of:

units in the framework structure and the molecular sieve has the x-ray diffraction pattern characteristic of zeolite Y, erionite, mordenite, zeolite L, offertite, chabazite, ZSM-5, LZ-105, zeolite omega or zeolite beta.

5. The molecular sieve of claim 4 where the rare earth metal is selected from the group consisting of lanthanum, cerium, neodymium, praseodymium, europium, samarium, gadolinium, dysprosium, holmium and mixtures thereof.

6. The molecular sieve of claim 5 where the rare earth metal is a mixture of praseodymium, neodymium, lanthanum and cerium.

7. A process for preparing a molecular sieve having a three-dimensional microporous framework structure which has an empirical formula on an anhydrous basis of:

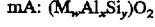

where A is at least one rare earth metal, "m" is the mole fraction of A and varies from about 0.01 to about (w+x), M is chromium or titanium, "w", "x", and "y" are the mole fractions of M, aluminum and silicon, respectively, present as framework tetrahedral oxide units and "w" has a value of about 0.01 to about 0.49, "x" has a value of about 0.01 to about 0.49 and "y" has a value of about 0.50 to about 0.98, said molecular sieve characterized in that it has the x-ray diffraction pattern characteristic of zeolite Y, erionite, mordenite, zeolite L, offertite, chabazite, ZSM-5, LZ-105, zeolite omega or zeolite beta, the process comprising contacting a crystalline zeolite Y having a $SiO_2/Al_2O_3$ ratio of at least 3 with a fluoro salt of M at a pH of about 3 to about 7, whereby framework aluminum atoms of the zeolite are removed and replaced by extraneous M atoms, contacting the M substituted molecular sieve with an aqueous solution containing at least one rare earth salt at ion exchange conditions to provide said molecular sieve.

8. The process of claim 7 where A is selected from the group consisting of lanthanum, cerium, neodymium, praseodymium, europium, samarium, gadolinium, dysprosium, holmium and mixtures thereof.

9. The process of claim 8 where A is a mixture of praseodymium, neodymium, lanthanum and cerium.

10. The process of claim 7 where the rare earth salt is selected from the group consisting of lanthanum chloride, lanthanum nitrate, cerium chloride, cerium nitrate, neodymium, chloride, neodymium nitrate, praseodymium, chloride, praseodymium nitrate, europium chloride, europium nitrate, samarium chloride, samarium nitrate, gadolinium chloride, gadolinium nitrate, dysprosium chloride, dysprosium nitrate, holmium chloride and holmium nitrate.

11. The process of claim 10 where the rare earth salt is a mixture of praseodymium chloride, neodymium chloride, lanthanum chloride and cerium chloride.

12. A hydrocarbon conversion process comprising contacting a hydrocarbon with a catalyst at hydrocarbon conversion conditions to give a converted product, the catalyst comprising a molecular sieve having a three-dimensional microporous framework structure which has an empirical formula on an anhydrous basis of:

$$mA: (M_wAl_xSi_y)O_2$$

where A is at least one rare earth metal, "m" is the mole fraction of A and varies from about 0.01 to about (w+x), M is chromium or titanium, "w", "x", and "y" are the mole fractions of M, aluminum and silicon, respectively, present as framework tetrahedral oxide units and "w" has a value of about 0.01 to about 0.49, "x" has a value of about 0.01 to about 0.49 and "y" has a value of about 0.50 to about 0.98, said molecular sieve characterized in that it has the x-ray diffraction pattern characteristic of zeolite Y, erionite, mordenite, zeolite L, offertite, chabazite, ZSM-5, LZ-105, zeolite omega or zeolite beta.

13. The process of claim 12 where the hydrocarbon conversion process is cracking.

14. The process of claim 12 where the hydrocarbon conversion process is alkylation.

15. The process of claim 12 where the hydrocarbon conversion process is isomerization.

16. The process of claim 12 where the hydrocarbon conversion process is hydroxylation.

17. The process of claim 12 where the hydrocarbon conversion process is epoxidation.

* * * * *